(12) United States Patent
Hintermeister et al.

(10) Patent No.: US 9,563,451 B2
(45) Date of Patent: *Feb. 7, 2017

(54) ALLOCATING HYPERVISOR RESOURCES

(71) Applicant: International Business Machines Corporation, Armonk, NY (US)

(72) Inventors: Gregory R. Hintermeister, Rochester, MN (US); Geraint North, Manchester (GB); Carl C. Pecinovsky, Rochester, MN (US)

(73) Assignee: International Business Mashines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 14/301,624

(22) Filed: Jun. 11, 2014

(65) Prior Publication Data
US 2015/0331706 A1    Nov. 19, 2015

Related U.S. Application Data

(63) Continuation of application No. 14/281,471, filed on May 19, 2014.

(51) Int. Cl.
*G06F 9/455* (2006.01)
*G06F 9/50* (2006.01)
*G06F 9/445* (2006.01)

(52) U.S. Cl.
CPC .......... *G06F 9/455* (2013.01); *G06F 9/45533* (2013.01); *G06F 9/45558* (2013.01); *G06F 9/50* (2013.01); *G06F 8/60* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 6,907,395 B1 * | 6/2005 | Hunt et al. | 703/21 |
| 8,327,353 B2 * | 12/2012 | Traut | 718/1 |
| 8,352,608 B1 * | 1/2013 | Keagy et al. | 709/226 |
| 8,418,176 B1 | 4/2013 | Keagy et al. | |
| 8,433,802 B2 | 4/2013 | Head et al. | |
| 8,458,717 B1 | 6/2013 | Keagy et al. | |
| 8,489,797 B2 | 7/2013 | Hegde et al. | |

(Continued)

OTHER PUBLICATIONS

Non-Final Office Action issued on Jul. 17, 2015 in U.S. Appl. No. 14/281,471, filed May 19, 2014.

(Continued)

*Primary Examiner* — Matthew Brophy
(74) *Attorney, Agent, or Firm* — Maeve Carpenter

(57) ABSTRACT

In an approach to allocating hypervisor resources for virtual machine deployment, one or more computer processors determine one or more hierarchically grouped computing resources within a hypervisor. The one or more computer processors receive a selection of one or more hierarchically grouped computing resources. The one or more computer processors apply deployment constraints for a workload to the selected one or more hierarchically grouped computing resources. The one or more computer processors determine, based, at least in part, on the deployment constraints for the workload, one or more computing resources from the one or more hierarchically grouped computing resources.

5 Claims, 6 Drawing Sheets

(56) References Cited

U.S. PATENT DOCUMENTS

| | | | |
|---|---|---|---|
| 8,572,138 B2* | 10/2013 | Sundar et al. | 707/828 |
| 8,683,478 B2* | 3/2014 | Anderson et al. | 718/104 |
| 8,949,392 B2* | 2/2015 | Kanda | 14/301 |
| 2002/0071386 A1 | 6/2002 | Gronke | |
| 2005/0120160 A1* | 6/2005 | Plouffe et al. | 711/1 |
| 2007/0028244 A1* | 2/2007 | Landis et al. | 718/108 |
| 2007/0233698 A1* | 10/2007 | Sundar et al. | 707/10 |
| 2009/0025007 A1 | 1/2009 | Hara | |
| 2009/0116381 A1* | 5/2009 | Kanda | 370/229 |
| 2009/0119396 A1* | 5/2009 | Kanda | 709/223 |
| 2010/0014526 A1* | 1/2010 | Chavan et al. | 370/395.53 |
| 2012/0159481 A1 | 6/2012 | Anderson | |
| 2012/0291028 A1* | 11/2012 | Kidambi et al. | 718/1 |
| 2013/0058331 A1* | 3/2013 | Thakkar et al. | 370/389 |
| 2013/0198482 A1 | 8/2013 | Ripberger | |
| 2013/0297964 A1* | 11/2013 | Hegdal et al. | 714/2 |
| 2013/0318228 A1* | 11/2013 | Raja et al. | 709/224 |
| 2013/0346967 A1 | 12/2013 | Anand et al. | |
| 2014/0372576 A1 | 12/2014 | Mohandas | |

OTHER PUBLICATIONS

Head, et al., "Virtual Hypervisor: Enabling Fair and Economical Resource Partitioning in Cloud Environments", 2010 IEEE, Apr. 19-23, 2010, pp. 104-111, ISSN 1542-1201, E-ISBN: 978-1-4244-5367-2, <http://ieeexplore.ieee.org/xpl/articleDetails.jsp?arnumber=5488444>.
IBM Power Virtualization Center Standard, Installation and User's Guide, Version 1.2, Dec. 6, 2013.
U.S. Appl. No. 14/281,471, filed May 19, 2014.

* cited by examiner

ALLOCATING HYPERVISOR RESOURCES

STATEMENT ON PRIOR DISCLOSURES BY AN INVENTOR

The following disclosure is submitted under 35 U.S.C. 102(b)(1)(A) as prior disclosures by, or on behalf of, a sole inventor of the present application or a joint inventor of the present application:

IBM Power Virtualization Center Standard, Installation and User's Guide, Version 1.2, dated Dec. 6, 2013.

BACKGROUND OF THE INVENTION

The present invention relates generally to the field of computer networks, and more particularly to allocating network resources in a virtualized computer network.

In system virtualization, multiple virtual systems are created within a single physical system. The physical system can be a stand-alone computer, or alternatively, a computing system utilizing clustered computers and components. Virtual systems are independent operating environments that use virtual resources made up of logical divisions of physical resources such as processors, memory and input/output (I/O) adapters. This system virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are the primary technology for system virtualization.

It is a common requirement today for virtualized environments to be able to enforce strict partitioning between different classes of workload, while still sharing hardware between workloads of the same class. Separation may be required for several reasons. One reason may be to enable high availability, such that two clustered workloads do not share a single point-of-failure. Another reason is for performance guarantees, such that the resource demands of one class of resources do not affect another class. A third reason is the concern for confidentiality. For example, two competing organizations may wish to utilize a single provider of virtualized environments, with the requirement that hardware is not shared. Typically, the unit of segregation is that of a single host system, i.e. a single instance of a hypervisor.

Multipathing allows a virtual machine to continue to communicate with external systems when a given physical adapter, or physical port, is not operating, either due to equipment failure or due to maintenance operations such as a firmware update. Multipathing is used extensively in mission-critical workloads to ensure continuity of service during hardware failure. It is typical to ensure that no single point of failure exists between a virtual machine and the external systems to which it connects.

SUMMARY

According to one embodiment of the present invention, a method for allocating hypervisor resources for virtual machine deployment is provided. The method for allocating hypervisor resources for virtual machine deployment may include one or more computer processors determining one or more hierarchically grouped computing resources within a hypervisor. The one or more computer processors receive a selection of one or more hierarchically grouped computing resources. The one or more computer processors apply deployment constraints for a workload to the selected one or more hierarchically grouped computing resources. The one or more computer processors determine, based, at least in part, on the deployment constraints for the workload, one or more computing resources from the one or more hierarchically grouped computing resources.

DETAILED DESCRIPTION

Advanced hypervisors allow a large degree of resource partitioning within a single hypervisor instance. Existing virtualization tools may not effectively capture partitioning requirements, which can span hypervisor instances, such that a user is able to effectively deploy a workload.

Embodiments of the present invention recognize that efficiency can be gained by implementing a model that captures many different methods of I/O connectivity segregation, such that the requirements of various classes of workload can be easily described and satisfied when a new workload is deployed. I/O connectivity includes all manner of connectivity, including ethernet networks, fibre channel, infiniband, etc. Implementation of embodiments of the invention may take a variety of forms, and exemplary implementation details are discussed subsequently with reference to the Figures.

Figure 1:
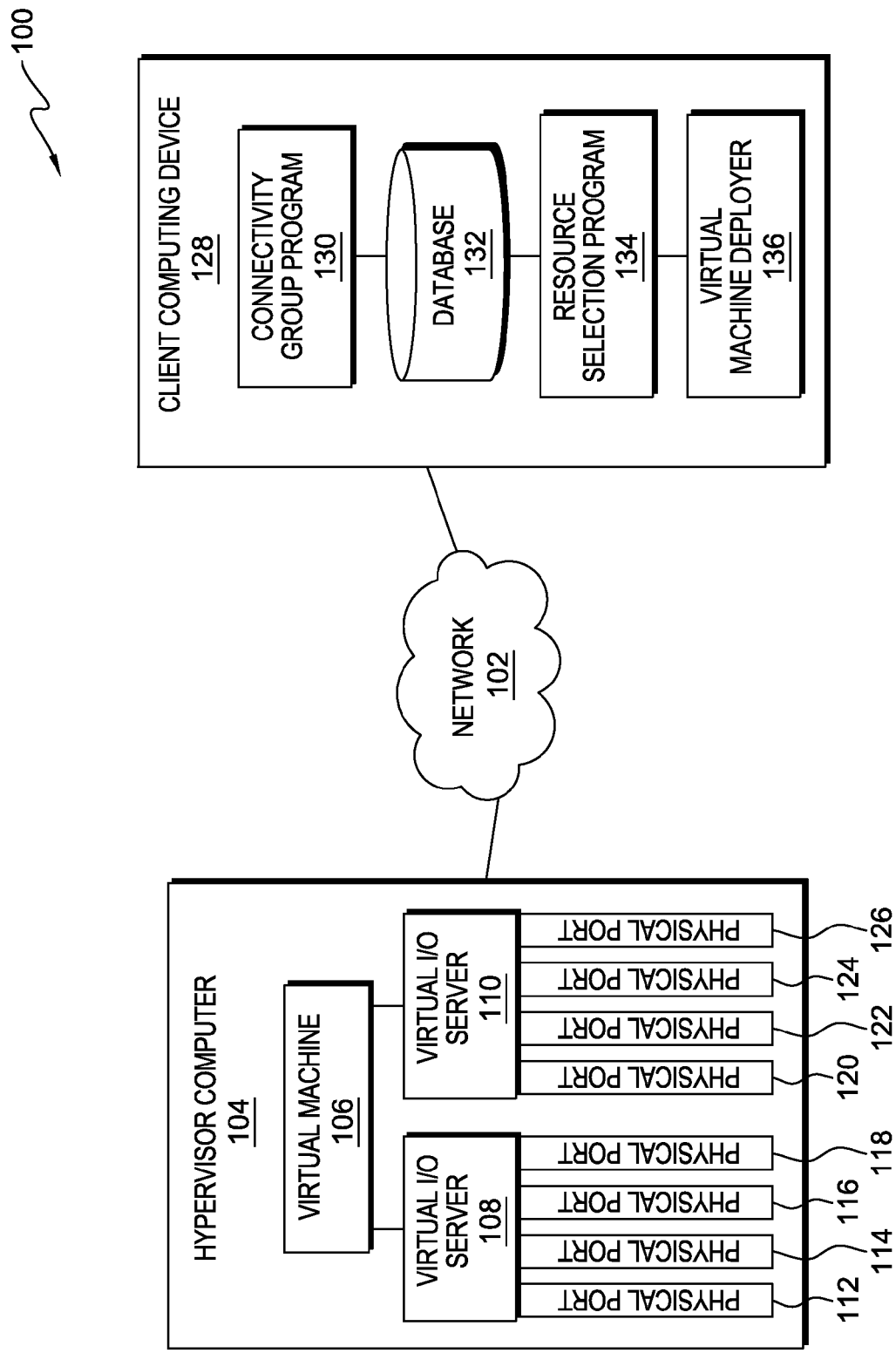
FIG. 1 is a functional block diagram illustrating a virtualized computing environment, in accordance with an embodiment of the present invention.

The present invention will now be described in detail with reference to the Figures. FIG. 1 is a functional block diagram illustrating a virtualized computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Virtualized computing environment 100 includes hypervisor computer 104 and client computing device 128, interconnected over network 102. Network 102 can be, for example, a local area network (LAN), a wide area network (WAN), such as the Internet, or a combination of the two, and can include wired, wireless, or fiber optic connections. In general, network 102 can be any combination of connections and protocols that will support communications between hypervisor computer 104 and client computing device 128.

Hypervisor computer 104 may be a management server, a web server, or any other electronic device or computing system capable of receiving and sending data. In other embodiments, hypervisor computer 104 may represent a server computing system utilizing multiple computers as a server system, such as in a cloud computing environment. In another embodiment hypervisor computer 104 may be a laptop computer, a tablet computer, a netbook computer, a personal computer (PC), a desktop computer, a personal digital assistant (PDA), a smart phone, or any programmable electronic device capable of communicating with client computing device 128 via network 102. In another embodiment, hypervisor computer 104 represents a computing system utilizing clustered computers and components to act as a single pool of seamless resources. Hypervisor computer 104 includes virtual machine (VM) 106, virtual I/O server 108, virtual I/O server 110, and physical ports 112, 114, 116, 118, 120, 122, 124, and 126.

In exemplary embodiments, VM 106 represents one or more virtual machines partitioned from hypervisor computer 104. VM 106 is a software implemented abstraction of hardware of hypervisor computer 104. VM 106 can be utilized to emulate functions of a physical computer (e.g., execute programs). In one embodiment, resources of hypervisor computer 104 (e.g., memory, central processing units (CPUs), storage devices, and I/O devices) can be partitioned into one or more virtual machines in VM 106.

Virtual I/O server 108 and virtual I/O server 110 are responsible for taking network and storage I/O requests from virtual machines and routing the I/O requests through appropriate physical hardware to a network, such as network 102. A given virtual machine can be configured to route I/O requests through specific virtual I/O servers. Virtual I/O server 108 and virtual I/O server 110 may also be one or more software libraries included as part of a hypervisor or a separate process or a separate virtual machine.

Physical ports 112, 114, 116, 118, 120, 122, 124, and 126 reside on printed circuit boards within hypervisor computer 104 and provide a physical network interface. Physical ports 112, 114, 116, 118, 120, 122, 124, and 126 handle the physical signaling characteristics of network media and converting the signals arriving from a network, such as network 102, to logical values.

Client computing device 128 may be a desktop computer, a laptop computer, a tablet computer, a specialized computer server, a smart phone, or any programmable electronic device capable of communicating with hypervisor computer 104 via network 102 and with various components and devices within virtualized computing environment 100. In general, client computing device 128 represents any programmable electronic device or combination of programmable electronic devices capable of executing machine-readable program instructions and communicating with other computing devices via a network, such as network 102. Client computing device 128 includes connectivity group program 130, database 132, resource selection program 134, and virtual machine (VM) deployer 136. Client computing device 128 may include internal and external hardware components, as depicted and described in further detail with respect to FIG. 6.

Connectivity group program 130 determines the hierarchical model of a virtualization system, starting at the bottom with the physical ports and adapters up to the host system. Connectivity group program 130 categorizes physical ports to associate the ports with a specific system fabric. Connectivity group program 130 defines one or more connectivity groups comprising the physical ports associated with a system fabric. Connectivity group program 130 is depicted and described in further detail with respect to FIG. 2.

Database 132 resides on client computing device 128. In another embodiment, database 132 may reside on hypervisor computer 104, or on another device or component within virtualized computing environment 100 accessible via network 102. A database is an organized collection of data. Database 132 may be implemented with any type of storage device capable of storing data that may be accessed and utilized by client computing device 128, such as a database server, a hard disk drive, or a flash memory. In other embodiments, database 132 may represent multiple storage devices within client computing device 128. Information stored on database 132 may include directories for data and documents used by client computing device 128, including output from connectivity group program 130, via network 102. The directories and data stored on database 132 may be accessed by users of other client computing devices in virtualized computing environment 100 (not shown).

Resource selection program 134 selects the appropriate physical resources to use for a new virtual machine deployment, based on a set of provided constraints. The constraints include the connectivity groups defined by connectivity group program 130, in addition to other constraints. For example, resource selection program 134 selects a physical host system that has sufficient CPU and memory resources available to run a virtual machine that is to be deployed. Resource selection program 134 selects one or more of a host system, one or more physical I/O ports that a virtual machine may use, and one or more virtual I/O servers to provide virtualized access to the one or more physical I/O ports. Resource selection program 134 is depicted and described in further detail with respect to FIG. 5.

VM deployer 136 creates a virtual machine, based on a given hardware selection made by resource selection program 134, by communicating with the relevant hypervisor and virtual I/O servers to configure the virtual components appropriately. In some embodiments, resource selection program 134 and VM deployer 136 may reside in a VM resource manager. A VM resource manager may create new virtual machines by first utilizing resource selection program 134 to select the resources onto which the virtual machine will be deployed, and then utilizing VM deployer 136 to configure the virtual machine.

Figure 2:
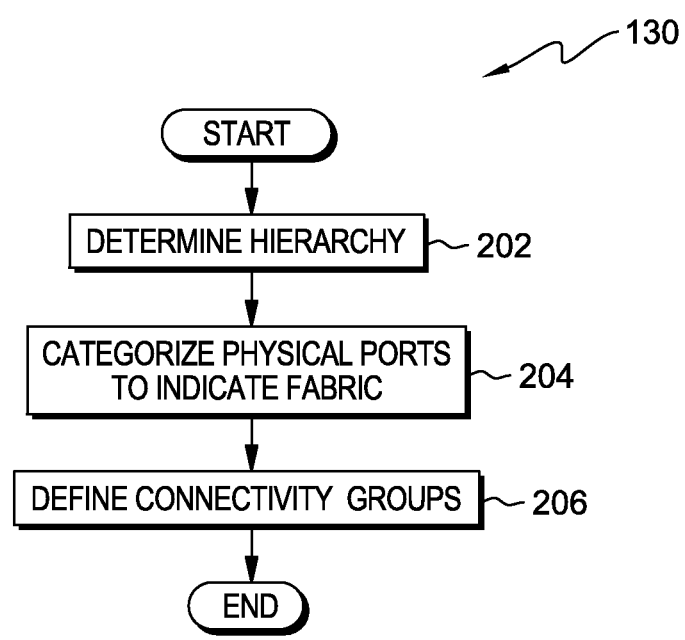
FIG. 2 is a flowchart depicting operational steps of a connectivity group program, on a client computing device within the virtualized computing environment of FIG. 1, for creating a model of I/O connectivity groups, in accordance with an embodiment of the present invention.

FIG. 2 is a flowchart depicting operational steps of connectivity group program 130, on client computing device 128 within virtualized computing environment 100 of FIG. 1, for creating a model of I/O connectivity groups, in accordance with an embodiment of the present invention.

Connectivity group program 130 determines a hierarchy (step 202). Connectivity group program 130 takes an inventory of the available components in virtualized computing environment 100. I/O virtualization environments may be represented as a hierarchy in which a physical port is associated with a specific hypervisor component, such as a virtual I/O server, which resides on a specific host, which may, in turn, be part of a larger group of hosts. An I/O path passes through a physical port. Due to the hierarchical nature of the virtualization environment, connectivity group program 130 determines groupings and dependencies between physical ports, and therefore dependencies between virtual I/O servers and host systems may be inferred, and may not need to be explicitly defined by a user.

Connectivity group program 130 categorizes the physical ports to indicate the associated fabrics (step 204). Fabrics are comprised of hardware elements such as switches, routers and gateways, and associated cabling. A fabric, or system fabric, is a network of connected systems that shares no physical infrastructure with other fabrics. A fabric is a means of connectivity between a server and other parts of the system, such as storage or the network. Having several fabrics within a system ensures redundancy to ensure a measure of fault tolerance. Connectivity group program 130 categorizes, or tags, each physical port with an indication of the specific fabric to which the port is connected. In one embodiment, connectivity group program 130 automatically discovers the categorization by programmatic interaction with the fabrics. In another embodiment, a user may provide the categorization. By categorizing each physical port with the fabric on which it resides, the redundancy offered by any given virtual I/O server, host, or ensemble (a collection of host systems) may be determined. Such a model not only allows new workloads to be created with a specified level of fault-tolerance, but also allows components with equivalent connectivity to be identified.

Connectivity group program 130 defines connectivity groups (step 206). Connectivity group program 130 creates a named grouping of physical ports, referred to as a connectivity group. In one embodiment, connectivity groups are defined programmatically. For example, connectivity group program 130 may divide the resources evenly between workload categories. In another embodiment, connectivity group program 130 receives input from a system administrator for the definition of which ports belong to which connectivity groups. Connectivity group program 130 stores the defined connectivity groups in database 132. Defining the connectivity groups creates a model for virtual machine deployment. At the time of creation of a virtual machine, a system administrator selects one or more connectivity groups for deployment.

Figure 3:
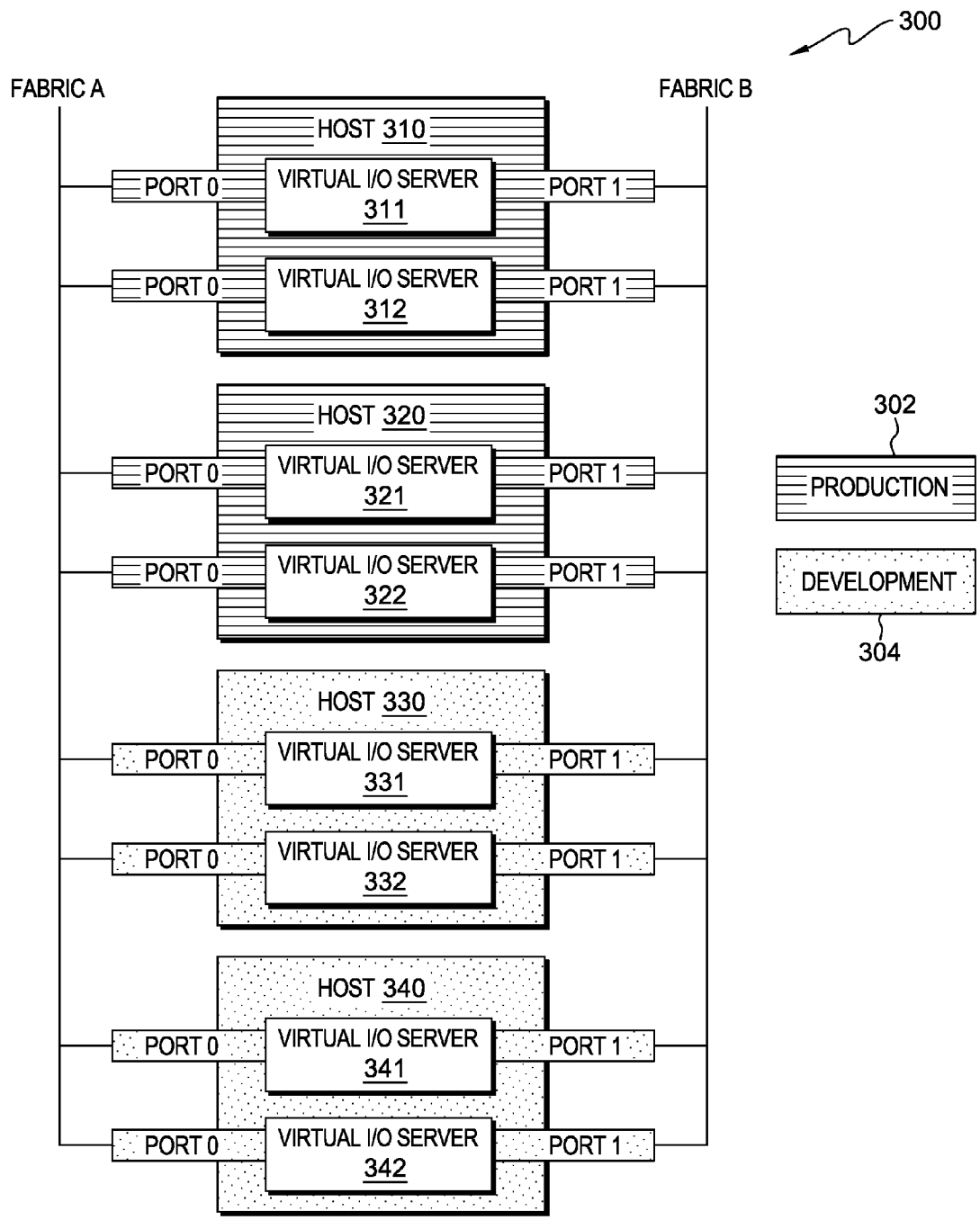
FIG. 3 illustrates an example of the operation of a resource selection program inserted on a client computing device within the virtualized computing environment of FIG. 1, in accordance with an embodiment of the present invention.

FIG. 3 illustrates example 300 of the operation of resource selection program 134 inserted on client computing device 128 within virtualized computing environment 100 of FIG. 1, in accordance with an embodiment of the present invention.

In the example, a system administrator plans to separate workloads by host system. Two connectivity groups have been defined via the steps described with respect to connectivity group program 130. Connectivity group 302 is defined as "Production". Connectivity group 304 is defined as "Development". Production workloads are processed on host 310, which includes virtual I/O servers 311 and 312, and host 320, which includes virtual I/O servers 321 and 322. Development workloads are processed on host 330, which includes virtual I/O servers 331 and 332, and host 340, which includes virtual I/O servers 341 and 342. The physical ports categorized, or tagged, "port 0" are on fabric A, and the physical ports categorized "port 1" are on fabric B. Production connectivity group 302 contains the eight ports from host 310 and host 320. Development connectivity group 304 contains the eight ports from host 330 and host 340.

With the connectivity group configuration in place, the system administrator may deploy a workload to production connectivity group 302 or development connectivity group 304. In this example, a production workload is deployed, therefore the system administrator selects production connectivity group 302. In addition, a constraint of path redundancy is applied.

By implication of the hierarchy, the choice of hosts is host 310 or host 320 because those are the hosts containing production physical ports. In this example, resource selection program 134 selects host 310. A host is selected based on a variety of criteria and constraints applied by the system administrator prior connectivity group selection, including load-balancing across hosts, maximizing the number of unused hosts, placing complementary workloads close to each other, etc.

Because the selected host is host 310, virtual I/O servers 311 and 312 are candidates for providing the I/O path to the virtual machine. Because path redundancy is required, resource selection program 134 selects both virtual I/O servers.

On each virtual I/O server of host 310, both physical ports, port 0 and port 1, are part of production connectivity group 302. Port 0 of both virtual I/O server 311 and virtual I/O server 312 is connected to system fabric A. Port 1 of both virtual I/O server 311 and virtual I/O server 312 is connected to fabric B. Because path redundancy is required, resource selection program 134 selects both physical ports on virtual I/O server 311 and on virtual I/O server 312.

The selections result in a new production virtual machine, configured on a host with a total of four paths to external systems, passing through each of two virtual I/O servers onto each of two system fabrics. Resource selection program 134 sends the virtual machine configuration to VM deployer 136 for workload deployment.

Figure 4:
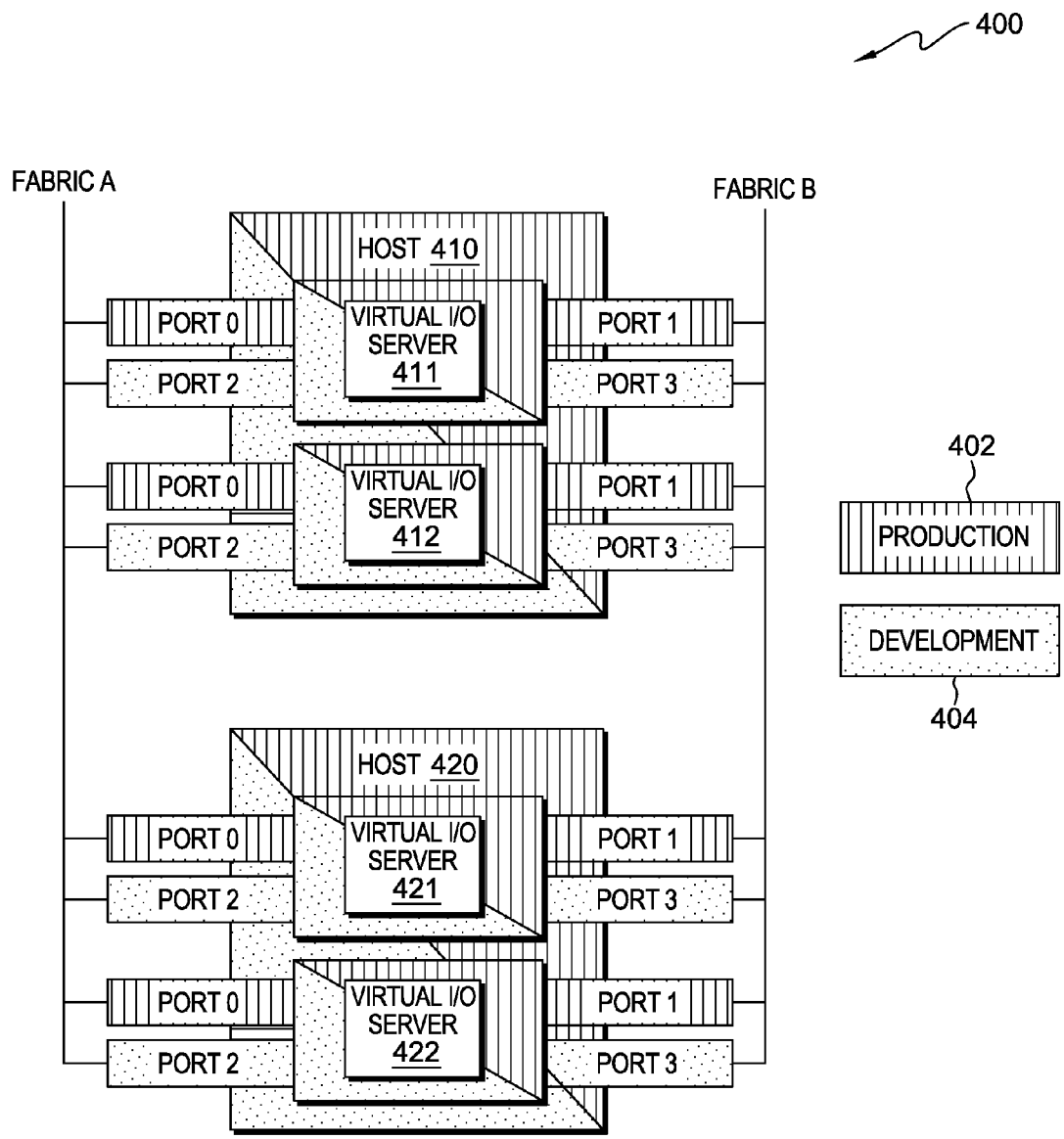
FIG. 4 illustrates an example of the operation of a resource selection program inserted on a client computing device within the virtualized computing environment of FIG. 1, in accordance with an embodiment of the present invention.

FIG. 4 illustrates example 400 of the operation of resource selection program 134 inserted on client computing device 128 within virtualized computing environment 100 of FIG. 1, in accordance with an embodiment of the present invention.

In example 400, similar to example 300 discussed earlier, two connectivity groups have been defined via the steps described with respect to connectivity group program 130. Connectivity group 402 is defined as "Production". Connectivity group 404 is defined as "Development". In this example, there are two hosts, host 410 and host 420, and there are two virtual I/O servers on each host. Host 410 includes virtual I/O servers 411 and 412. Host 420 includes virtual I/O servers 421 and 422. The virtual I/O servers have physical ports that are dedicated for use by specific connectivity groups, based on the categorization. The physical ports categorized, or tagged, "port 0" and "port 2" are on fabric A, and the physical ports categorized "port 1" and "port 3" are on fabric B. Production connectivity group 402 contains four ports from host 410 and four ports from host 420. Development connectivity group 304 also contains four ports from host 410 and four ports from host 420.

With the connectivity group configuration in place, the system administrator may deploy a workload to production connectivity group 402 or development connectivity group 404. In this example, a production workload is deployed, therefore the system administrator selects production connectivity group 402. In addition, a constraint of path redundancy is applied.

By implication of the hierarchy, resource selection program 134 determines the choice of hosts is host 410 or host 420 because both hosts contain production physical ports. In this example, resource selection program 134 selects host 410.

Because the selected host is host 410, virtual I/O servers 411 and 412 are candidates for providing the I/O path to the virtual machine. Because path redundancy is required, resource selection program 134 selects both virtual I/O servers.

On each virtual I/O server, only port 0 and port 1 are part of production connectivity group 402, and one port is connected to each fabric. Because path redundancy is required, resource selection program 134 selects port 0 and port 1 on virtual I/O server 411 and port 0 and port 1 on virtual I/O server 412.

The selections result in a new production virtual machine, configured on a host with a total of four paths to external systems, passing through each of two virtual I/O servers onto each of two system fabrics. The production and development workloads are segregated at the port level such that development I/O does not impact the bandwidth available for production I/O. Resource selection program 134 sends the virtual machine configuration to VM deployer 136 for workload deployment.

Figure 5:
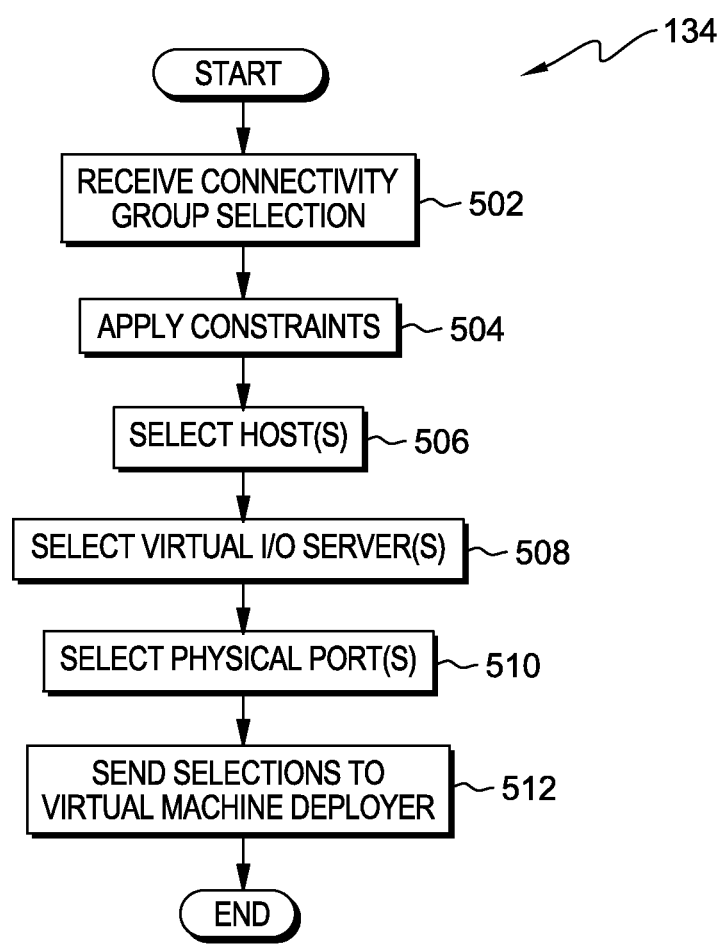
FIG. 5 is a flowchart depicting operational steps of a resource selection program where workloads share hosts, on a client computing device within the virtualized computing environment of FIG. 1, for configuring a virtual machine by segregating I/O connectivity, in accordance with an embodiment of the present invention.

FIG. 5 is a flowchart depicting operational steps of resource selection program 134 where workloads share hosts, on client computing device 128 within virtualized computing environment 100 of FIG. 1, for configuring a virtual machine by segregating I/O connectivity, in accordance with an embodiment of the present invention.

Resource selection program 134 receives a connectivity group selection (step 502). Based on the categorization of the connectivity groups, a system administrator selects the appropriate connectivity group from database 132 for the current deployment activity. In example 300, the current deployment is for a production virtual machine, therefore resource selection program 134 receives the selection of production connectivity group 302.

Resource selection program 134 applies constraints to the selected connectivity group (step 504). For example, if the system administrator determines that redundancy is a requirement of the workload deployment, then resource selection program 134 may apply the constraint that the chosen host must include ports in the selected connectivity group that are connected to different fabrics to ensure continuity of service during a hardware failure. In another example, resource selection program 134 may apply a constraint of a particular storage controller to be used in the workload deployment. In a further example, resource selection program 134 may apply a constraint regarding memory requirements, because not all hosts have enough memory for a particular workload deployment.

Resource selection program 134 selects host(s) (step 506). Based on the system hierarchy and the categorization of the connectivity groups, resource selection program 134 selects one or more hosts that meet the requirements of the workload deployment and the previously applied constraints. In example 300, resource selection program 134 selects host 310 because host 310 contains production physical ports.

Resource selection program 134 selects virtual I/O server(s) (step 508). Based on the host selected in the previous step, resource selection program 134 selects the available virtual I/O server, such as virtual I/O server 108 in FIG. 1, in the connectivity group that meets the requirements of the workload deployment and the previously applied constraints. In example 300, resource selection program 134 selects virtual I/O server 311 and virtual I/O server 312 because both are connected to host 310, which includes ports connected to different fabrics, and redundancy is a requirement.

Resource selection program 134 selects physical port(s) (step 510). Based on the previously selected virtual I/O server and the categorization, or tagging, of the physical ports to a specific fabric, resource selection program 134 selects one or more physical ports that meet the requirements of the workload deployment and the previously applied constraints. In example 300, resource selection program 134 selects both physical ports on each virtual I/O server because redundancy is a requirement.

Resource selection program 134 sends the selections to VM deployer 136 (step 512). As discussed earlier, VM deployer 136 is responsible for creating a virtual machine, based on the selections made by resource selection program 134 in the previous five steps. Responsive to completion of the previous five steps, resource selection program 134 sends the selections to VM deployer 136 for workload deployment and creation of a virtual machine.

In another embodiment, resource selection program 134 may be used during workload relocation operations. A VM may be moved from one physical host to a second physical host for one or more of a plurality of reasons, for example, load-balancing, evacuation of a failing component, or to satisfy the need to place a given workload closer to some external systems. The VM continues to have the same connectivity and fault-tolerance requirements on the second physical host. Using resource selection program 134 to select resources on the second physical host ensures the expected connectivity is maintained.

In another embodiment, resource selection program 134 may be applied to the selection of other physical resources, in addition to I/O resources. Resource selection program 134 may be applied where a system administrator prefers specific direction to allow or deny access to a resource for specific groups of users or types of workload. For example, resource selection program 134 may be used to select cryptographic acceleration hardware, graphics processing units (GPU), field programmable gate arrays (FPGAs), etc.

Figure 6:
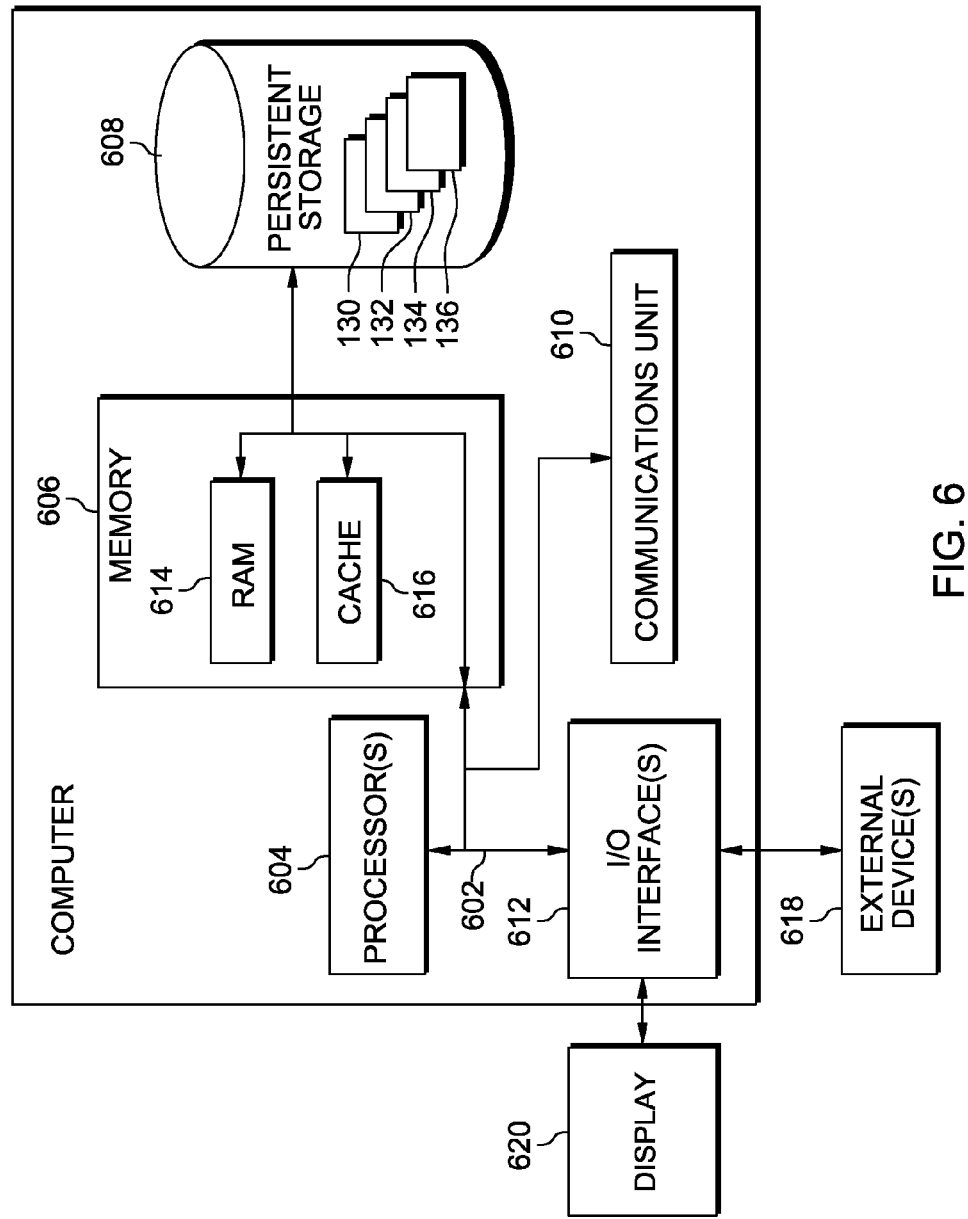
FIG. 6 depicts a block diagram of components of the client computing device of FIG. 1 executing the resource selection program, in accordance with an embodiment of the present invention.

FIG. 6 depicts a block diagram of components of client computing device 128 of FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Client computing device 128 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Connectivity group program 130, database 132, resource selection program 134, and virtual machine deployer 136 are stored in persistent storage 608 for execution by one or more of the respective computer processor(s) 604 via one or more memories of memory 606. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of hypervisor computer 104. In these examples, communications unit 610 includes one or more network interface cards. Communications unit 610 may provide communications through the use of either or both physical and wireless communications links. Connectivity group program 130, database 132, resource selection program 134, and virtual machine deployer 136 may be downloaded to persistent storage 608 through communications unit 610.

I/O interface(s) 612 allows for input and output of data with other devices that may be connected to client computing device 128. For example, I/O interface(s) 612 may provide a connection to external device(s) 618 such as a keyboard, a keypad, a touch screen, and/or some other suitable input device. External device(s) 618 can also include portable computer readable storage media such as, for example, thumb drives, portable optical or magnetic disks, and memory cards. Software and data used to practice embodiments of the present invention, e.g., connectivity group program 130, database 132, resource selection program 134, and virtual machine deployer 136, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for allocating hypervisor resources for virtual machine deployment, the method comprising:
    determining, by one or more computer processors, an inventory of available computing resources;
    determining, by one or more computer processors, a hierarchical model of computing resources from the inventory, wherein the model includes one or more hierarchically grouped computing resources within a hypervisor, the one or more hierarchically grouped computing resources including at least two physical ports associated with one or more system fabrics of physical computing resources, wherein, based on the at least two ports, one or more dependencies between one or more I/O servers and one or more host systems are inferred, and wherein the one or more system fabrics are a network of connected systems that share no physical infrastructure with other fabrics,
    wherein determining a hierarchical model of computing resources further includes categorizing the at least two physical ports to indicate the associated one or more system fabrics of physical computing resources and, based on the categorization, defining one or more connectivity groups, wherein a connectivity group is a named grouping of the at least two physical ports;
    receiving, by the one or more computer processors, a selection of one or more connectivity groups, based, at least in part, on the categorization of each of the at least two physical ports, wherein the at least two physical ports share connectivity within a virtualized computing environment;
    applying, by the one or more computer processors, deployment constraints for a workload to the selected one or more connectivity groups; and
    determining, by the one or more computer processors, based, at least in part, on the deployment constraints for the workload, one or more physical computing resources from the one or more connectivity groups, the one or more physical computing resources to be used for a virtual machine deployment.

2. The method of claim 1, wherein workload deployment constraints include one or more of: a path redundancy, one or more memory resources required for the workload, and one or more CPU resources required for the workload.

3. The method of claim 1, wherein hierarchically grouped computing resources include one or more of virtual computing resources.

4. The method of claim 1, further comprising, responsive to determining, based, at least in part, on the deployment constraints of the workload, one or more physical computing resources from the one or more connectivity groups, sending, by the one or more computer processors, information regarding the selected one or more connectivity groups for virtual machine deployment.

5. The method of claim 1, wherein the one or more system fabrics are comprised of hardware elements including one or more of: a switch, a cable associated with a switch, a router, a cable associated with a router, a gateway, or a cable associated with a gateway.

* * * * *